United States Patent

[11] 3,557,756

| [72] | Inventor | Thomas J. Ramsey<br>Neptune, N.J. |
|---|---|---|
| [21] | Appl. No. | 780,762 |
| [22] | Filed | Dec. 3, 1968 |
| [45] | Patented | Jan. 26, 1971 |
| [73] | Assignee | Ramsey Industries Corporation<br>Farmingdale, N.J.<br>a corporation of New Jersey |

[54] CONTAINERIZED STORING AND SHIPPING UNIT FOR ANIMALS, BIRDS AND SPECIMENS FOR BIOLOGICAL STUDY
7 Claims, 9 Drawing Figs.

[52] U.S. Cl. ..................................... 119/15,
119/17, 119/19, 119/37
[51] Int. Cl. ........................................... A01k 01/00,
A01k 01/02, A01k 31/00
[50] Field of Search ........................................ 119/15, 17,
18, 19, 21, 37

[56] References Cited
UNITED STATES PATENTS

| 2,176,484 | 10/1939 | Blakeslee | 119/37 |
|---|---|---|---|
| 2,335,173 | 11/1943 | Corey | 119/21 |
| 2,703,570 | 3/1955 | Young, Jr. | 119/15X |
| 2,791,199 | 5/1957 | Hamnett | 119/37X |
| 2,997,021 | 8/1961 | Bailey | 119/37 |
| 3,116,712 | 1/1964 | Ogden et al. | 119/3 |
| 3,237,599 | 3/1966 | Torrey et al. | 119/19 |
| 3,284,226 | 11/1966 | Schuler | 119/18 |
| 3,367,308 | 2/1968 | Quattrone et al. | 119/15 |
| 3,429,297 | 2/1969 | Schroer | 119/17 |

*Primary Examiner*—Aldrich F. Medbery
*Attorney*—Howard T. Jeandron

ABSTRACT: A container divided into a plurality of cells for the storage and shipment of animals, birds or live specimens for biological study in which each animal, bird or specimen is isolated in a separate cell and each cell has a controlled atmosphere by supplying it with clean, filtered air that is thermostatically controlled to a predetermined temperature and predetermined humidity. The airflow may also be treated with a germicidal lamp to kill and eliminate any disease germs. Each container may have an electric plug in for AC power supply and an auxiliary DC power supply to maintain all components active whenever the AC supply is removed or fails. Additional features may be provided such as a water supply for drinking and screen floors and floor trays for drainage.

PATENTED JAN 26 1971
3,557,756
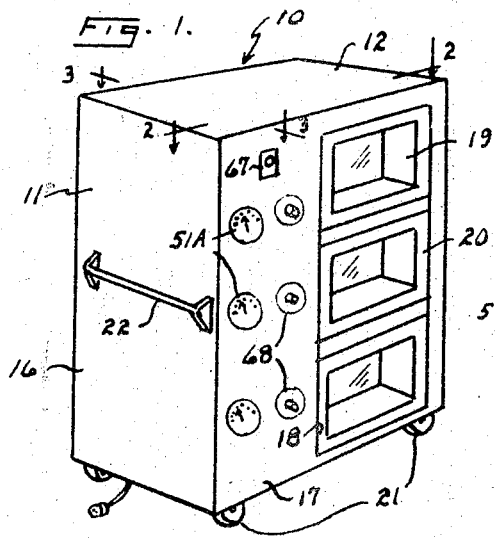
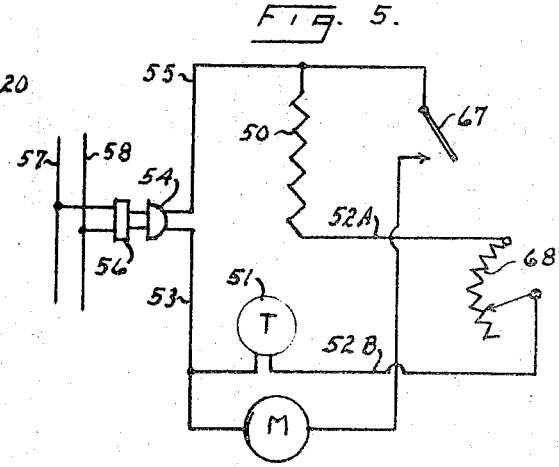
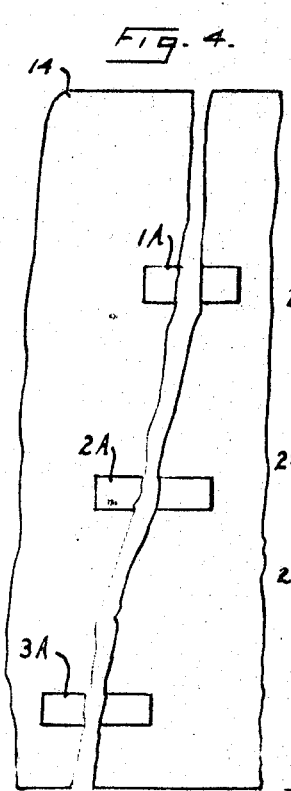
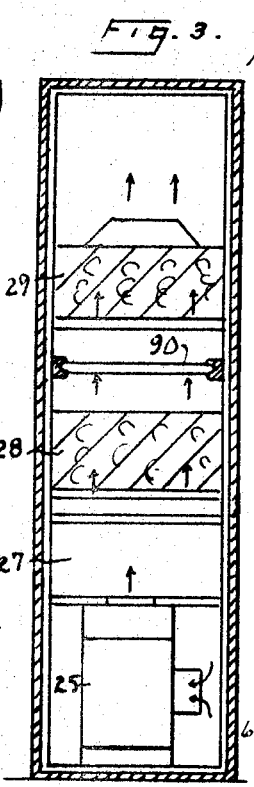
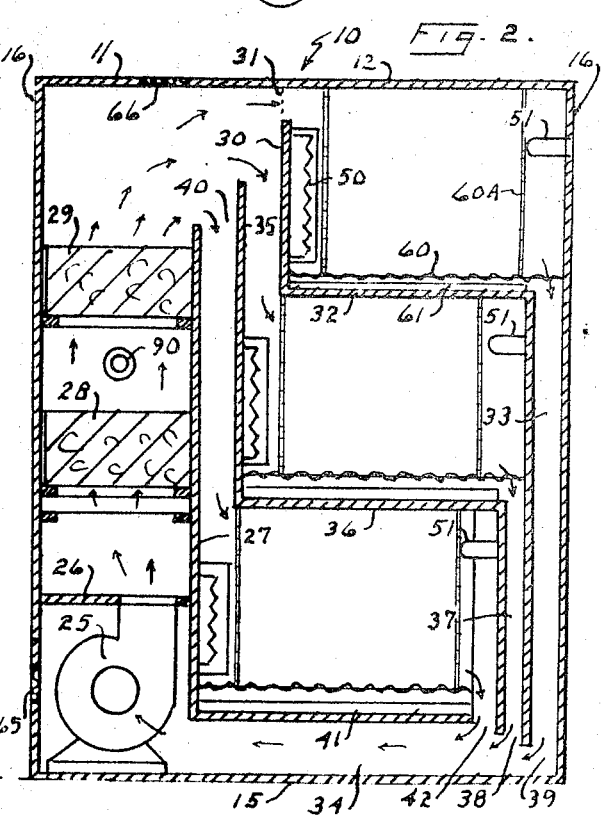
INVENTOR.
THOMAS J. RAMSEY
BY Howard T. Jeanblan
AGENT

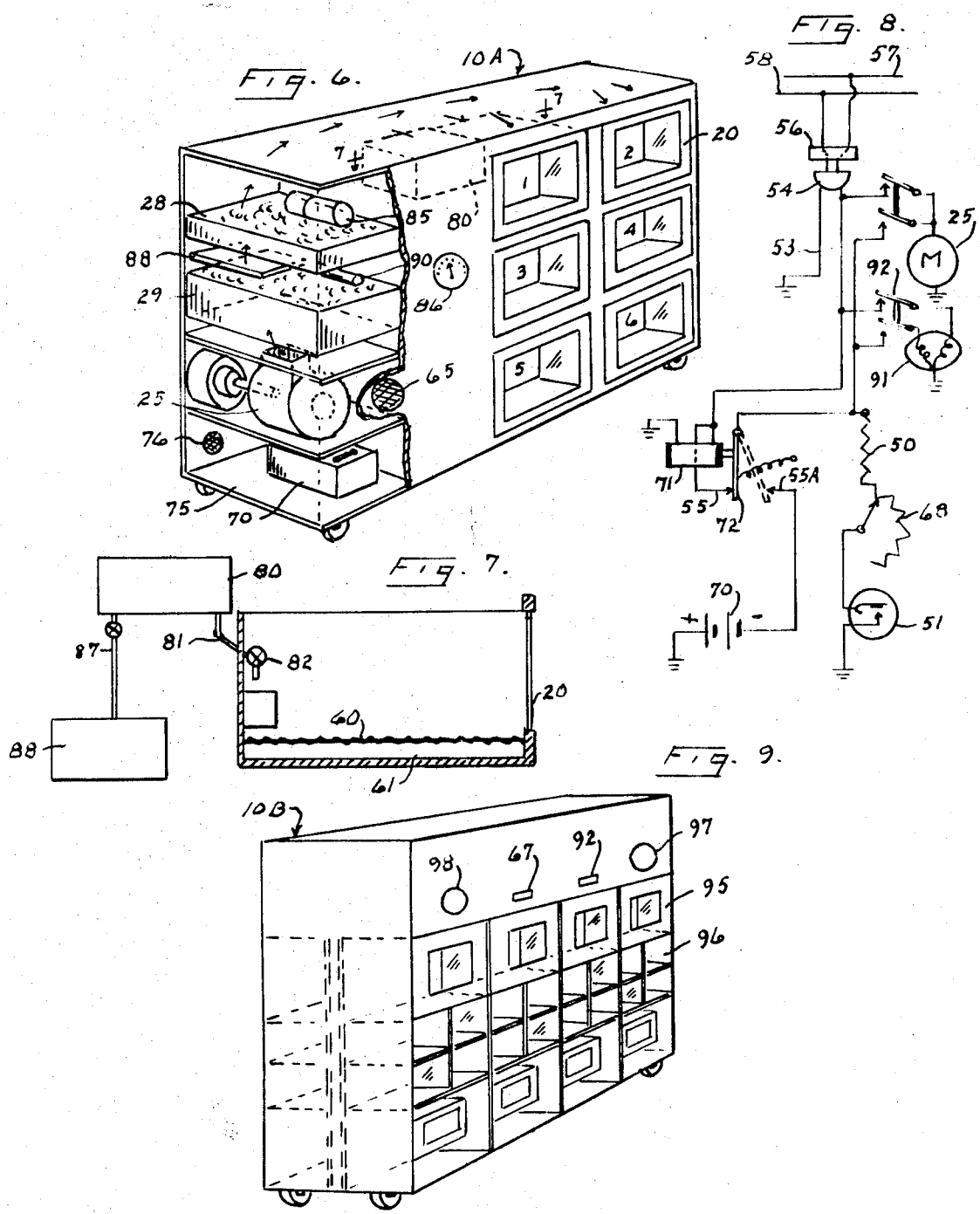

CONTAINERIZED STORING AND SHIPPING UNIT FOR ANIMALS, BIRDS AND SPECIMENS FOR BIOLOGICAL STUDY

This invention relates to the care and isolation of animals, birds and specimens during storage and transportation for biological laboratory study and more particularly to a unit where each animal, bird or specimen is isolated from any other animal bird or specimen in a separate cell and said cell is maintained at a desired temperature, humidity and clean air flow while being stored or transported.

At present animals are transported from their native environment to a supply center for sale to hospitals and laboratories for experimental biological test. The animals, such as monkeys, are all shipped in a common container or cage. If one animal is found to be sick or carrying any disease germs, the whole shipment must be destroyed.

It is an object of this invention to provide a shipping container in which a group of animals, birds or specimens may be transported but in which each animals, bird or specimen is isolated and each isolated cell or cage is conditioned to maintain a desired temperature, humidity and clean air.

It is a further object of this invention to maintain each animal, bird or specimen isolated in separate cells in a shipping container while providing a controlled atmosphere in each that is compatible with the normal environment of each animal, bird or specimen.

It is a still further object of this invention to provide an easily transportable, mobile container for biological use that is divided into a plurality of separate cells with means to maintain a desired temperature in each separate cell that may vary from other cells and a desired degree of humidity, while removing all foul air and supplying fresh filtered air as well as germicidally treated air to each separate cell.

It is a still further object of this invention to provide an easily transportable, mobile container for biological use that is divided into a plurality of separate cells with external plug-in electrical supply of AC to an electrically operated unit to maintain a desired temperature in each separate cell that may vary from other cells and a desired degree of humidity, while removing all foul air and supplying fresh filtered air as well as germicidally treated air to each separate cell.

It is a still further object of this invention to provide an easily transportable, mobile container for biological use that is divided into a plurality of separate cells with external plug-in electrical supply of AC to an electrically operated unit and a standby DC supply for operation when the AC supply fails to maintain a desired temperature in each separate cell that may vary from other cells and a desired degree of humidity, while removing all foul air and supplying fresh filtered air as well as germicidally treated air to each separate cell.

It is a further object of this invention to provide a shipping container in which a group of animals, birds or specimens may be transported but in which each animal, bird or specimen is isolated and each isolated cell or cage is provided with an open screen floor and below the screen floor a removable floor tray and trap doors on the enclosing casing for removal of the floor trays for cleaning.

It is a further object of this invention to maintain each animal, bird or specimen isolated in separate cells in a shipping container and provide a water tank with water connection to each cell to provide drinking water while providing a controlled atmosphere in each cell that is compatible with the normal environment of each animal, bird or specimen.

It is a still further object of this invention to provide an easily transportable, mobile container for biological use that is divided into a plurality of separate cells with means to maintain a desired temperature in each separate cell that may vary from other cells and a desired degree of humidity, while removing all foreign matter and foul air by means of filters and supplying fresh, filtered air as well as germicially treated air to each separate cell.

Other objects of this invention may be apparent by reference to the accompanying detailed description and the drawings in which:

FIG. 1 is a perspective view of a small self-contained storage or shipping container according to this invention, FIG. 2 is a cross-sectional view taken on line 2–2 of FIG. 1, FIG. 3 is a cross-sectional view taken on line 3–3 of FIG. 1, FIG. 4 is a back elevational view of the shipping container shown in FIG. 1, FIG. 5 is a schematic circuit diagram for the embodiment shown in FIG. 1, FIG. 6 is a perspective view of a larger self-contained storage or shipping container that is completely self-contained for storage or transportation, FIG. 7 is a cross-sectional view taken on line 7–7 of FIG. 6, FIG. 8 is a schematic circuit diagram for the embodiment shown in FIG. 6, and FIG. 9 is a perspective view of a still larger self-contained storage or shipping container that is completely self-contained for storage or transportation.

In the storage and shipment of animals, birds or specimens for experimental biological use, it is of the utmost importance to maintain the animal, bird or specimen in a healthy normal condition free from contamination and supplied with everything to insure their healthy condition. With the present rapid transport, such as air transport, the shipping unit should be as nearly self-sufficient as possible so that it may be treated similar to all containerized shipments without special attendance or duties to be performed during shipment. Thus the container may have very few restrictions that make it different from any other container. In some instances for short air travel, the container may be completely self-sufficient. For longer periods of shipment, the restriction may require that each container be plugged in to a source of AC potential. For still longer periods requiring storage, a further condition may be added in which each container must be serviced, that is, the filling of the water tank for supply to each cell, the plug-in of the unit to an AC supply and periodic removal of the floor trays for cleaning and periodic feeding of a prescribed food for animals or birds.

Referring to FIGS. 1, 2, 3 and 4 there is illustrated a small unit 10 for the transportation or storage of a few animals, birds or specimens. In this unit 10 there is an outside casing 11 comprised of a top panel 12, a back panel 14 and a bottom 15, side panels 16 and front panel 17 having an aperture 18 for access to the individual cells 19 by means of a door or enclosing panel 20. The complete unit 10 may be mounted on pivotal rollers or wheels 21 for easily moving said unit about. Also a pair of handles 22 may be affixed to the sides 16 to assist in handling the movement of said unit. Referring to FIG. 2, the unit is divided with partitions, that is, with three cells, The partitions must be formed to segregate the three cells from each other while providing an inflow of air from a blower 25 and an exhaust of air from each cell back to the blower 25. Thus blower 25 is mounted on the base or bottom panel 15 with its fresh air output port through a supporting panel 26 and an extended vertical panel 27 to provide the air duct and the movement of the air upward in the casing. Mounted above the blower supply is a charcoal filter 28 completely closing the duct area so that all air must pass through the filter 28. In addition a second filter 29 which may be a high efficiency particulate air filter to filter out virus, bacteria, smokes and other air borne particles is mounted so that all air passing through filter 28 will then pass through filter 29 and moves upward in the container 10 and is circulated to pass through each of the cells 1, 2 and 3. Cell 1 is divided by a partition 30 which extends from the back panel 14 to the front panel 17 and the top of the partition is slightly below the top 12 to provide an inlet area 31 for the air flowing upward and into the cells 1, 2 and 3. Partition 30 forms the back of cell 1 and is bent at right angles to extend toward the side of the unit providing the floor 32 and the floor 32 extends from the front to the back. At the side the floor does not meet the wall or side 16 but bends at right angles and extends downward to form a air return duct 33. The panel 30 does not extend downward to form a duct 33. The panel 30 does not extend to the bottom but allows a spaced opening or exhaust port 39 for the air that has passed through cell 1 and down the duct 33 to be exhausted through the port 39 into exhaust duct 34 along the bottom 15 to be carried back to the blower 25. Similarly a partition 35 is spaced well below the top 12 and spaced from the partition 30 and extends from the back to the front of the unit to form cell 2. Partition 35, at the bottom of cell 2, is bent at right angles to form the floor 36 and thus extends from the back to the front and extends to a point short of the duct 33 where it is again bent at right angles and extends downward to provide a further duct 37 and duct 37 extends to a point above the bottom 15 to provide an air exhaust port 38 so that the air passing through cell 2 will be exhausted into the duct 34 to be carried back to the blower. Similarly the partition 27 that retains the filter units forms one wall for cell 3 and provides an inlet duct 40 to permit the air from the blower to pass downward into cell 3 and a partition 41 extends from partition 27 at its bottom which is spaced from the bottom 15 to a point that is spaced from duct 37 to provide an exhaust port 42. Thus the air from the blower that passes through duct 40, through cell 3 and out exhaust port 42, will pass through duct 34 back to the blower. In addition heaters 50 are provided so that a single heater 50 may be positioned in each of the cells 1, 2 and 3. The heaters are controlled by placing an individual thermostat 51 in each cell and the heaters and thermostats are connected in a circuit to an extension line which extends through the casing of the unit 10 to be plugged into an electrical 110 volt AC supply.

Referring to FIG. 5 there is illustrated a schematic circuit diagram for the unit 10 in which the thermostat 51 and the heating element 50 are connected through a rheostat 68 by leads 52A and 52B, that is, 52A connects one side of the heating element to one side of the rheostat. The opposite terminal of the rheostat is connected by lead 52B to the thermostat. The opposite side of the thermostat is connected by a lead 53 to a plug 54. The opposite side of the heating element is connected by a lead 55 to the opposite side of plug 54. Plug 54 may be plugged into a receptacle 56 to be connected to the live wire 57 and ground 58 of 110 volt AC. Cells 1, 2 and 3 may also be provided with perforated stainless steel partitions 60A and removable perforated stainless steel floor panels 60 that are positioned above the floor of the cell and removable floor trays 61 positioned under the panels 60 on the floor of each cell. The floor trays 61 extend over the entire lower area of the cell but do not cover the exhaust duct. The floor trays 61 are removable through the back 14 by means of trap doors 1A, 2A and 3A. The trap doors are provided of sufficient size to permit the removal of the floor tray for cleaning. The floor trays are only removed when the blower is one so that the atmosphere within the unit is pressurized and when the trap door is opened, there will be an outflow of air and no unfiltered air can enter any of the cells while being cleaned. The floor trays, after cleaning, are reinserted by opening the trap door and immediately closing to retain the unit completely sealed for atmospheric control. It is also to be noted that, although the air is recirculated through the unit, fresh air is drawn in through a port 65 and an additional vent port 66 may be provided in the top of the unit. The vent port may be controlled so as to prevent excessive pressure building up within the unit. It is to be noted that on the front of the unit, a blower switch 67 is provided for turning the blower on and off, the blower being shown in the schematic circuit, FIG. 5, where lead 53 is connected to one side of the blower and lead 55 is connected through the switch 67 to the opposite side of the blower. The thermostatic elements 51 may be of the visual type so that the visual gauge portion 51A will be mounted on the front panel to indicate the temperature within each cell. Elements 50 are controlled by a rheostat 68 so that the rheostat 68 will be settable for each cell.

A still further embodiment of this invention is illustrated in FIG. 6 in which casing 10A encloses a greater number of cells 6 and includes additional features but is similar in construction, that is, the container 10A is provided with two units of three cells similar to the first embodiment illustrated in FIGS. 1 through 4 and is also provided with a similar blower 25 and filters 28–29 so that the air taken in through an inlet port 65 will be forced through the filters 28 and 29 and circulated over and down through cells 1 to 6 and returned to the blower to be recirculated and refiltered. In addition the humidity of the atmosphere may also be controlled that is, if the air is too humid with a transducer or humidity element 85, the humidity may be indicated on a meter 86. If the humidity is too high, the heating element in one or all cells may be utilized to dry the air to reduce the degree of humidity. In the event that the air being circulated is too dry, water from tank 80 through a tube 87 may be fed to a pad 88 that is positioned between the filters 28 and 29. Thus the air will pick up the moisture from pad 88 and restore the degree of humidity desired for the atmosphere in any one or all cells as desired.

A similar schematic circuit is illustrated in FIG. 8 which is similar to the schematic circuit illustrated in FIG. 5 but in addition, there is provided a standby DC power source 70 so that if there is a failure in the AC circuit or if the AC circuit is unplugged for transportation, when the AC circuit is broken, a solenoid 71 will be deenergized and the contact 72 that normally closes the lead 55 to the heating element 50 will be interrupted and contact 72 will be pulled against lead 55A that extends to one side of the storage battery 70. The opposite side of storage battery 70 is grounded. The opposite side of the schematic circuit lead 53 is also grounded. Therefore battery 70 will supply the potential to heating element 50 controlled by rheostat 68 for the desired degree of temperature and shown by thermostat 51 to continue an operation while the AC circuit has been removed. When the AC circuit is again reenergized, solenoid 71 will pull contact 72 back to close the circuit through lead 55 directly to heating element 50 and through the circuit as described and battery 70 is disconnected. Thus the blower and the heating elements will be maintained energized at all times whether the AC circuit is in use or the standby DC circuit is in use. Of course this means that the blower will be operated by a DC-AC motor operating with either circuit and similarly the heaters and thermostat will be responsive to either AC or DC circuit. It is to be noted that the storage battery 70 is mounted in a lower compartment 75 isolated from the airflow so that no gas from the storage battery may contaminate the air flow. This compartment may be provided with a vent 76.

Referring to FIG. 7 which illustrates a cross-sectional view of one of the cells of the unit, other features are included, that is, a water tank 80, FIGS. 6 and 7, may be incorporated and the water tank 80 will be connected by tubing 81 to each of the cells and by gravity flow, water may be supplied to each of the cells. A drinking container may be hung within the cell and the spout 82 at the end of the tube may be set to permit a desired drip or may be provided with a float valve (not shown) for maintaining water within the drinking cup. Each cell may be provided with the same open screen floor 60 and removable tray 61 as in the previous embodiment. The front of each cell may be provided with enclosing door or panel 20 as in the previous embodiment which permits the insertion or removal of the animal, bird or specimen and also permits the opening of the door or panel 20 for feeding as needed. Additional features may be added, for example, a germicidal lamp 90 may be inserted between the two filters 28 and 29 so that all air passing through will be acted upon by this lamp to kill any germs that may pass through the filters. A still further feature may be added in the form of a lamp 91 that may be inserted in each cell, lamp 91 being connected into the schematic circuit of FIG. 8 by connecting one side of the lamp through a switch 92, the switch on the opposite side being connected to one side of the line, the lamp on the opposite side being connected to the opposite side of the circuit. Thus the light may be turned on in any cell by closing the switch 92 which is an individual switch for each cell. The lamp 91 must therefore be a dual lamp in which one filament will be illuminated by an AC circuit whereas a second filament would be illuminated by a DC circuit. Or, two lamps may be provided (not shown), one lamp being AC and the other lamp being DC Referring to FIG. 9 there is illustrated a still larger unit 10B which in reality comprises a duplication of the unit illustrated in FIG. 6. Certain modifications may or may not be included, that is, there may be a blower unit for each of the units combined or there may be a blower unit for all units and the cells may vary in size, that is, an upper group of cells 95 may be larger than a lower group of cells 96 and although individual thermostats are provided in the embodiments of FIG. 1 and FIG. 6, a single thermostatic element 97 may be used and a single rheostat 98 may be used and switch 67 for the blower unit and switch 92 for illumination may be provided for all units. Or the individual cells may be controlled as described in the prior embodiment. Although we have described heater elements 50 for maintaining temperature within each cell, the heating element 50 may be replaced by a combined air-conditioning heating element (not shown) so that the thermostat will either demand heat or will demand cooling. Or a single air-conditioning unit may be inserted in the blower compartment so that the air supplied to the blower will be cooled if desired and the air conditioner controlled by the demand of the thermostat. Thus cooler air may be supplied to all cells when a thermostat is demanding the cooler atmosphere. Thus there may be many liberties taken in styling any unit according to the customer's demands to isolate every animal, bird or specimen and to provide individual care for each or to isolate every animal, bird or specimen but provide a single care unit for air circulation, for temperature, for light and thus reduce the degree of attendance according to the use of the device. This is important due to the variation in the animals, birds and specimens that will use the various units. A shipment of three animals, birds or specimens as in the unit illustrated in FIG. 1 may be strictly a means of segregating three similar specimens. Whereas in the embodiment illustrated in FIG. 6, there may be six different specimens and the individualized care required. However in the embodiment illustrated in FIG. 9, there may be a large shipment of one type of animal, such as monkeys, where a single control is sufficient but isolation between animals is provided so that no contamination from any one animal can affect all animals yet the complete shipment will meet the legal requirements and in the event of disease to any one animal, only that one animal must be destroyed.

Although we have described various embodiments to provide different control for the storage and shipment of animals, birds or specimens, various modifications may be made with regard to size of the cells, with regard to degree of atmospheric control or with regard to additional requirements that may be necessary for any particular type of specimen without departing from the spirit of this invention.

I claim:

1. A mobile container for the storage and shipment of animals, birds and live specimens individually for biological study which includes an enclosing casing, a plurality of casters to support said casing, a battery of removable isolated and sealed cells mounted with said casing, a motor-driven recirculation air source to supply a flow of air through a separate continuously open inlet to each cell and a separate exhaust outlet from each cell, an air-conditioning unit that includes a filter and germ removing means in said air source, said inlet to each cell individually receiving clean air from said filter and germ removing means, said outlet from each cell directing used and foul air from said cell back through separate return ducts to said recirculating air source, a heater in each cell, said heaters controlled by a thermostat in each cell, a transducer within each cell to indicate the humidity, a variable rheostat connected to said heaters to regulate the amount of heat supplied to each cell, the above arrangement constituting a house means to each animal, bird or live specimen separately in an independent cell and maintain a desired atmosphere within each cell of said container.

2. In a device according to claim 1 in which said heaters, said thermostats and said transducers in each cell are individually controlled to provide a desired atmosphere that may be predetermined for each cell.

3. In a device according to claim 1 in which a DC storage battery is also enclosed in said casing and connected to said AC circuit as a standby unit, means to maintain said circuit energized with either AC or DC and means to operate said blower with either AC or DC.

4. In a device according to claim 1 in which a water tank is also enclosed in said casing and connected to each cell to provide a supply of drinking water, means to regulate the flow of water as predetermined for each cell.

5. In a device according to claim 1 in which said germ-removing means is a germicidal lamp and a filter located in said air duct to kill and eliminate any disease germs.

6. In a device according to claim 1 in which each cell is provided with a wire mesh floor above the cell bottom and a slideable tray on said cell bottom, a trap door opposite the side of each tray for removing said trays for cleaning, said trap doors biased closed, means to maintain air pressure greater than atmospheric pressure within each cell when opening said trap doors for removing and cleaning said floor trays.

7. In a device according to claim 1 in which each cell is provided with a lamp, means to illuminate any cell individually.